(12) United States Patent
Hubert et al.

(10) Patent No.: US 10,577,990 B2
(45) Date of Patent: Mar. 3, 2020

(54) INTERNAL COMBUSTION ENGINE HAVING AT LEAST ONE CRANKCASE OF THE DRY-SUMP TYPE

(71) Applicant: AIRBUS HELICOPTERS, Marignane (FR)

(72) Inventors: Pierre-Julien Hubert, Igny (FR); Pierre Gavanier, Croissy sur Seine (FR); Christian Mercier, La Fare les Oliviers (FR)

(73) Assignee: AIRBUS HELICOPTERS, Marignane, Cedex (FR)

( * ) Notice: Subject to any disclaimer, the term of this patent is extended or adjusted under 35 U.S.C. 154(b) by 99 days.

(21) Appl. No.: 15/728,903

(22) Filed: Oct. 10, 2017

(65) Prior Publication Data
US 2018/0106170 A1    Apr. 19, 2018

(30) Foreign Application Priority Data
Oct. 17, 2016    (FR) ...................................... 16 01502

(51) Int. Cl.
| F01M 11/00 | (2006.01) |
| F01M 1/02 | (2006.01) |
| F02B 75/06 | (2006.01) |
| F01M 1/12 | (2006.01) |
| F16F 15/00 | (2006.01) |
| F04C 2/12 | (2006.01) |

(52) U.S. Cl.
CPC .......... *F01M 11/0004* (2013.01); *F01M 1/02* (2013.01); *F01M 1/12* (2013.01);
(Continued)

(58) Field of Classification Search
CPC ........ F01M 11/0004; F01M 1/02; F01M 1/12; F01M 2001/0238; F01M 2001/123;
(Continued)

(56) References Cited

U.S. PATENT DOCUMENTS

| 2,405,061 A | * | 7/1946 | Shaw ...................... F04C 2/102 |
| | | | 418/132 |
| 3,619,093 A | | 11/1971 | Frelolshelm et al. |

(Continued)

FOREIGN PATENT DOCUMENTS

| DE | 102010011477 A1 | 9/2011 |
| FR | 2803125 A1 | 6/2001 |

(Continued)

OTHER PUBLICATIONS

French Search Report for French Application No. FR 1601502, Completed by the French Patent Office, dated Jun. 26, 2017, 6 pages.

(Continued)

*Primary Examiner* — Syed O Hasan
(74) *Attorney, Agent, or Firm* — Brooks Kushman P.C.

(57) ABSTRACT

An internal combustion engine having at least one crankcase for defining a guide housing in which at least one crankshaft is guided in rotation about an axis of rotation and lubricated by a lubricating fluid, the at least one crankcase being of the "dry-sump" type. Such an internal combustion engine has at least two pumps forming a pump train of pumps on a common axis, the pump train being fitted in a cylindrical bore of the at least one crankcase.

20 Claims, 3 Drawing Sheets

(52) U.S. Cl.
CPC .............. *F02B 75/06* (2013.01); *F04C 2/126* (2013.01); *F16F 15/00* (2013.01); *F01M 2001/0238* (2013.01); *F01M 2001/123* (2013.01); *F01M 2001/126* (2013.01); *F01M 2011/0079* (2013.01); *F01M 2011/0083* (2013.01); *F04C 2240/601* (2013.01)

(58) Field of Classification Search
CPC ..... F01M 2001/126; F01M 2011/0079; F01M 2011/0083; F02B 75/06; F04C 2/126; F16F 15/00
See application file for complete search history.

(56) References Cited

U.S. PATENT DOCUMENTS

| | | | |
|---|---|---|---|
| 5,580,232 A | 12/1996 | McEndarfer | |
| 6,823,829 B1 * | 11/2004 | Kawamoto | F01M 1/02 123/196 R |
| 7,832,997 B2 * | 11/2010 | Williamson | F01C 21/108 418/21 |
| 2008/0083392 A1 * | 4/2008 | Kurihara | F01M 1/04 123/196 CP |

FOREIGN PATENT DOCUMENTS

| | | |
|---|---|---|
| GB | 2205611 A | 12/1988 |
| JP | H03237207 A | 10/1991 |
| JP | 2006132342 A | 5/2006 |

OTHER PUBLICATIONS

European Search Report for European Application No. EP17204484, dated May 29, 2018, 7 pages.
Canadian Office Action for Application No. 2,987,117 dated Oct. 16, 2018, 4 pages.

* cited by examiner

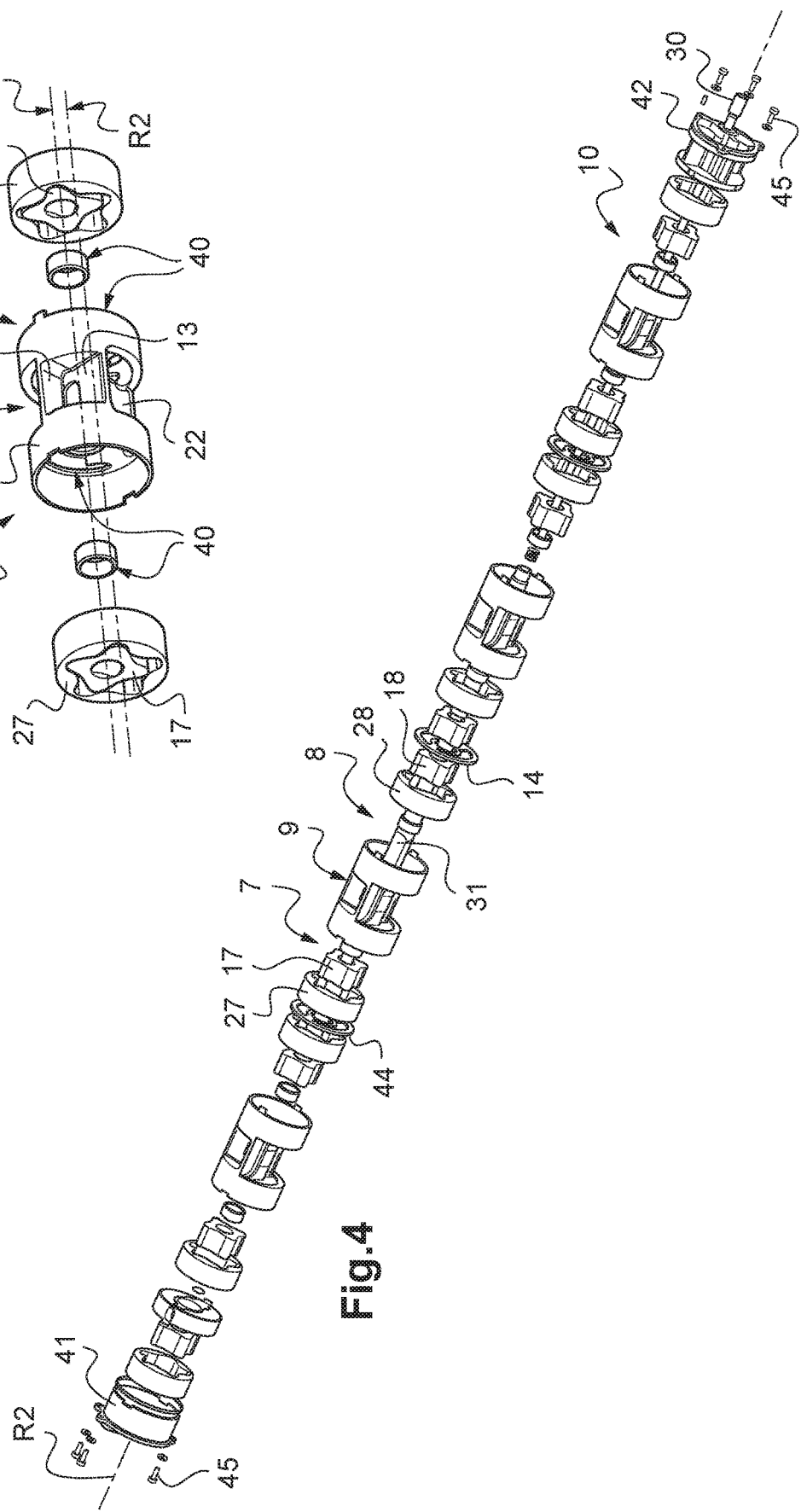

INTERNAL COMBUSTION ENGINE HAVING AT LEAST ONE CRANKCASE OF THE DRY-SUMP TYPE

CROSS-REFERENCE TO RELATED APPLICATIONS

This application claims priority to French patent application No. FR 16 01502 filed on Oct. 17, 2016, the disclosure of which is incorporated in its entirety by reference herein.

BACKGROUND OF THE INVENTION (1) Field of the Invention

The present invention relates to the field of internal combustion engines having controlled ignition or compression ignition.

More particularly, the invention relates to an internal combustion engine having one or more crankcases that are said to be of the "dry-sump" type since they have at least one separate lubricating fluid tank into which the lubricating fluid of the engine is conveyed.

(2) Description of Related Art

This type of internal combustion engine, referred to as a dry-sump engine, presents operating efficiency that is improved compared with other types of internal combustion engine referred to as "wet-sump" engines. Specifically, dry-sump internal combustion engines serve in particular to eliminate power losses associated with at least one crankshaft stirring through its lubricating fluid as it rotates in at least one guide housing of the crankcase(s).

Such "dry-sump" internal combustion engines generally include a plurality of pumps for pumping the mixture of lubricating fluid and air in at least one inlet zone of the guide housing(s) in the crankcase(s). More particularly, the mixture may be pumped by a unitary pump for pumping the lubricating fluid that is present in each of the chambers suitable for receiving at least one crankshaft connecting rod in a guide housing.

As described in Document GB 2 205 611, a unitary pump is then secured via a fixed type connection to an outside wall of the crankcase so as to be able to pump out the lubricating fluid it contains and take it to a separate tank. Furthermore, such unitary pumps can then be connected mechanically to one another via their unitary rotary axis in order to form a train of pumps driven by a single sheave or by a single gearwheel secured to one of the rotary shafts of a unitary pump.

In addition, trains of pumps can also be formed by a plurality of pumps arranged on a common axis in the same pump casing secured to the crankcase. The various pumps making up the train can then be driven by a common drive shaft, as described in Documents JP H03 237207, DE 10 2010 011477, and JP 2006 132342.

Nevertheless, an internal combustion engine of that type is not optimized and presents a certain number of defects.

Firstly, that type of pump train requires a large number of parts to be assembled in order to enable each of the unitary pumps to be secured via a fixed type connection with the engine crankcase(s). A train of pumps of that type in accordance with the prior art is thus very burdensome.

Furthermore, depending on their location within the train of pumps, the pumps may differ in order to correspond to the order of the chambers suitable for receiving at least one connecting rod or indeed as a function of their respective positions relative to the ends of the engine. For example, a specific pump may be used for pumping the lubricating fluid present in a timing cover, while the other pumps of the train are identical and serve to pump the lubricating fluid present in each of the chambers.

The various pumps can be driven only from one to the next, with driving power being delivered via one end of the train of pumps, the first driven pump driving the next, and so on. Consequently, such a train of pumps does not make it possible to make any adjustment seeking to damp vibration while it is rotating.

In addition, the hydraulic inlet junctions between the various unitary pumps and the engine crankcase(s) are numerous and subject to leaking.

Likewise, the outlet junctions of each of the unitary pumps with the common outlet pipework for the mixture of lubricating fluid and air lie outside the crankcase(s) and are thus subjected to leaking. The connection surfaces between the common pipework and each of the unitary pumps are determined as a function of how each unitary pump is mounted relative to the crankcase(s). Consequently, such a connection surface is not accurately plane and makes it difficult to provide sealing between the connection surface and the common outlet pipework.

Finally, engine vibrations act directly on each unitary pump or on the pump casing attached to the crankcase, thereby stressing the fastenings with the crankcase. Securing unitary pumps or pump casings individually in that way with the crankcase(s) then leads to difficulty in ensuring the ability of the assembly to withstand fatigue over time.

BRIEF SUMMARY OF THE INVENTION

An object of the present invention is thus to propose an internal combustion engine making it possible to be free of the above-mentioned limitations.

As mentioned above, the invention relates to an internal combustion engine having at least one crankcase for defining a guide housing in which at least one crankshaft is guided in rotation about an axis of rotation V and lubricated by a lubricating fluid, the crankcase(s) being of the "dry-sump" type, such an internal combustion engine comprising:
  a tank of lubricating fluid separate from the crankcase(s);
  at least two pumps forming a pump train of pumps on a common axis and serving to pump a mixture formed by the lubricating fluid and gas at least from the crankcase(s), the at least two pumps each respectively comprising an inner lobe rotor and an outer lobe rotor, the inner lobe rotor being rotatable about a first axis of rotation R1 and the outer lobe rotor being rotatable about a second axis of rotation R2 parallel to the first axis of rotation R1, each inner lobe rotor of the pump train being driven in rotation by a common drive shaft rotatable about the first axis of rotation R1, each outer lobe rotor of the pump train being driven in rotation by an inner lobe rotor of the pump train, and the pump train being fitted in a cylindrical bore of the crankcase(s), the cylindrical bore having an axis R coinciding with the second axis of rotation R2 and distinct from the first axis of rotation R1; and
  at least one pipe enabling the crankcase(s) to be put into fluid flow communication with the at least two pumps and the tank of lubricating fluid.

Such an engine is remarkable in that the common drive shaft comprises a driving inner shaft and a hollow outer shaft driven by the inner shaft, the inner and outer shafts being arranged coaxially relative to each other.

In other words, the internal combustion engine has a common drive shaft in which the hollow outer shaft serves to drive rotation of the various inner lobe rotors of the pump train simultaneously.

Furthermore, the pump train has an outside cylindrical shape that is complementary to the shape of the cylindrical bore of the crankcase(s). In this way, the pump train can be pre-assembled on the common drive shaft and then inserted and positioned inside the cylindrical bore in a single installation operation by being moved in translation along a direction along the axis R of the cylindrical bore.

Such lobe pumps are generally referred by the term "positive displacement pumps", and they are characterized by flow rate being proportional to speed of rotation independently of the delivery pressure.

Furthermore, this particular arrangement of the pump train makes it possible to make use of any architecture for a multi-cylinder engine in which the order of the pumps in the pump train can easily be made to correspond to a preferred order in the pumping functions that are to be performed.

In addition, driving the pump train by means of a common drive shaft of flexibility that can be adjusted by adjusting its shape, and in particular its diameter or its profile, provides additional latitude for adjusting inertias and stiffnesses relating to the vibratory behavior of the engine associated with its application. Furthermore, it is also possible to subdivide or take action on the profiles of the various segments making up the common drive shaft.

In addition, such an arrangement of the common drive shaft as two coaxial shafts makes it possible, by way of example, to damp potential twisting vibration of the drive shaft and/or of the transmission drive train for transmitting the rotary motion delivered by the engine to members suitable for generating a traction force or a propulsion force in order to drive movement of a vehicle having such an engine. This damping and this ability to adapt twisting vibration in a vehicle can thus be achieved by designing the driving inner shaft and/or the hollow outer shaft of the pump train with appropriate dimensions or particular shapes.

Furthermore, inserting the pump train inside the cylindrical bore of the crankcase(s) serves to eliminate any plane junction surface between the outer pump casings and the crankcase(s). Specifically, each pump is no longer individually secured to the crankcase(s). Furthermore, the clearance present between the pump train and the cylindrical bore into which it is inserted in sliding contains the lubricating fluid, which can thus contribute to damping any relative movements between them. In this way, the wear associated with such relative movements can be controlled, or even eliminated.

Advantageously, the axis R of the cylindrical bore is arranged parallel to the axis of rotation V of the crankshaft(s).

Such a parallel arrangement between the axis of rotation V of the crankshaft(s) and the axis of rotation R of the cylindrical bore serves to optimize the compactness and the resulting weight of the crankcase(s) of such an internal combustion engine.

In practice, the at least two pumps may have a common pump casing with an outer face of shape that is complementary to the shape of the cylindrical bore in the crankcase(s), the common pump casing being prevented from rotating relative to the cylindrical bore, the common pump casing having a central portion serving to define a common inlet chamber and a common outlet chamber for the at least two pumps delivering the mixture formed by the lubricating fluid and gas.

In this way, the pump train may have at least one group of two pumps sharing a common pump casing. The shape of the outside face of the pump casing co-operates in complementary manner with the shape of the cylindrical bore. Nevertheless, some minimum amount of radial clearance allows the common pump casing to be inserted in translation into the inside of the cylindrical bore.

According to an advantageous characteristic of the invention, the crankcase(s) may include at least one inlet hole, each of the inlet hole(s) serving to put the guide housing of the crankcase(s) into hydraulic communication with the common inlet chamber of the common pump casing.

This or these inlet hole(s) thus enable the lubricating fluid contained in the guide housing(s) of the crankcase(s) to be extracted so as to go to the common inlet chamber of the at least two pumps.

Advantageously, the crankcase(s) may include a common outlet manifold for delivering the mixture formed by the lubricating fluid and gas, the common outlet manifold being arranged substantially parallel relative to the axis R of the cylindrical bore.

In this manner, the outlet manifold may also be machined directly in the crankcase(s), thereby eliminating potential leaks of lubricating fluid through one or more joint planes.

In practice, the crankcase(s) may include at least one outlet hole, the outlet hole(s) serving to put the common outlet chamber of the common pump casing into hydraulic communication with the common outlet manifold.

As above, this or these outlet holes thus enable the lubricating fluid contained in the common outlet chamber of the at least two pumps to be extracted to go to the common outlet manifold and the communications between the pump trains. By way of example, once the outlet hole(s) have been made they can be "plugged" on the outside so as to eliminate sources of leaks from the high pressure portion hydraulically connected to the separate lubricating fluid tank of the crankcase(s).

Advantageously, a drive member may be secured with a fixed type connection to the inner shaft at a proximal end of the inner shaft, the inner and outer shafts being secured to each other with a fixed type connection at a distal end of the inner shaft.

In other words, the drive member and the inner shaft do not have any freedom to move relative to each other. By way of example, such a drive member may be formed by a gearwheel suitable for meshing with a toothed wheel secured to, or more generally driven in rotation by, a drive shaft, such as in particular the crankshaft. In another embodiment that is equivalent, such a drive member may also be formed by a driven sheave that is driven in rotation by a belt, itself driven in rotation by a drive sheave that is driven in rotation by a drive shaft.

In contrast, it is possible to retain a degree of freedom to move in translation between the inner and outer shafts at the distal end of the inner shaft. Fluting of complementary shapes may for example be arranged at the distal end in order to eliminate any degree of freedom to move in rotation about the first axis of rotation R1.

In practice, the common drive shaft may have an ability to deform elastically in twisting.

By way of example, such an ability to deform elastically may correspond to the common drive shaft being capable, in normal operation, of moving angularly in twisting in over a range of 10° to 15°. Such an ability to deform elastically can then be adapted to damping twisting modes of vibration in the drive train for transmitting rotary motion, e.g. that is used for delivering traction, propulsion, and/or lift in the air for a vehicle having the internal combustion engine mounted thereon. In other words, this ability to deform elastically makes it possible to provide at least one additional degree of freedom in twisting in the vibratory system including the drive train for transmitting rotary motion in the vehicle on which such an engine is mounted.

Furthermore, the rotary motion of the common drive shaft may be transmitted to each inner lobe rotor in various different ways.

Thus, in a first embodiment of the invention, each inner lobe rotor of the pump train may have an inner face co-operating with an outer face of the common drive shaft, the facing inner and outer faces being of complementary shapes of polygonal section.

Such a polygonal section for an outer face of the common drive shaft may be triangular in shape, for example. Naturally, other equivalent means for transmitting drive torque may also be used, such as in particular fluting or keys.

In a second embodiment of the invention, each inner lobe rotor of the pump train may have an inside face co-operating with an outside face of the common drive shaft, the facing inside and outside faces having fluting of complementary shapes.

Furthermore, whatever the embodiment used, such inner and outer rotors may be made for example of a thermoplastic material such as polyetheretherketone (PEEK) filled with about 25% of short carbon fibers.

In practice, the pump train may include at least one guide bearing for guiding rotation about the first axis of rotation R1, the guide bearing(s) being arranged coaxially with the common drive shaft.

Such a guide bearing thus serves to eliminate friction between the common drive shaft and the common pump casing. The guide bearing thus serves to allow rotary motion without friction about the first axis of rotation R1 for the common drive shaft relative to the common pump casing which remains stationary in the cylindrical bore.

BRIEF DESCRIPTION OF THE DRAWINGS

The invention and its advantages appear in greater detail from the context of the following description of examples given by way of illustration and with reference to the accompanying figures, in which:

FIG. 3 is an exploded perspective view of a set of two pumps fitted to an internal combustion engine in accordance with the invention;

FIG. 4 is a an exploded perspective view of a train of pumps fitted to an internal combustion engine in accordance with the invention.

Elements that are present in more than one of the figures are given the same references in each of them.

DETAILED DESCRIPTION OF THE INVENTION

As mentioned above, the invention relates to an internal combustion engine having at least one dry-sump type crankcase.

Figure 1:
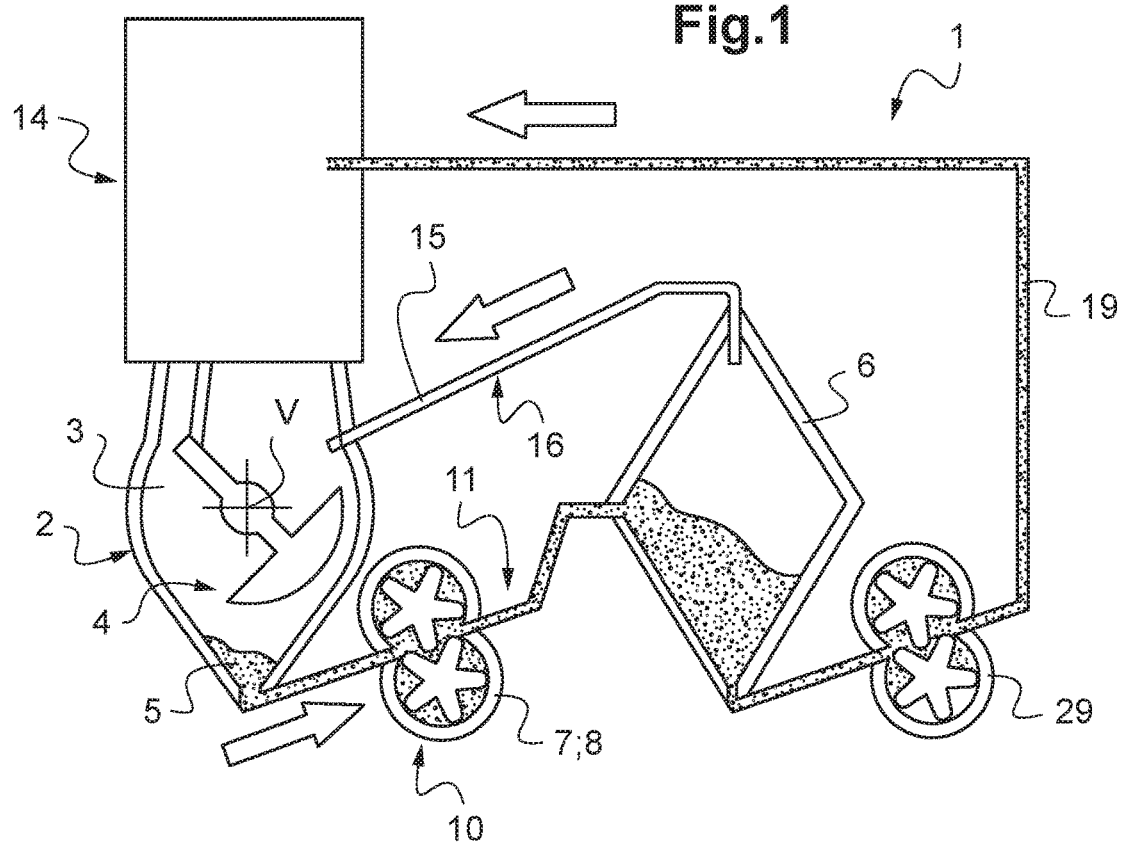
FIG. 1 is a diagrammatic side view of an internal combustion engine with a dry-sump type crankcase, in accordance with the invention.

As shown in FIG. 1, such an internal combustion engine 1 comprises an "upper" engine block 14 having at least one cylinder head and at least one cylinder in which at least one piston performs reciprocating motion in translation.

Conventionally, such an internal combustion engine 1 also has a "lower" engine block including at least one crankshaft 4 and at least one crankcase 2 defining a guide housing 3 for guiding the crankshaft 4 in rotation about an axis of rotation V. Such an at least one crankcase 2 is said to be of the dry-sump type since the lubricating fluid 5 is constantly pumped out from the guide housing 3 by means of at least two pumps 7 and 8.

Furthermore, these at least two pumps 7, 8 are arranged on a common axis in order to define a pump train 10 so as to enable the lubricating fluid 5 to be sucked simultaneously from the various compartments of the crankcase(s) 2 and/or from the upper engine block 14 and the crankcase(s) 2.

A pipe 11 then serves to convey the lubricating fluid 5 from the crankcase(s) 2 to the pump train 10 and then towards a separate tank 6. Another pump 29, which is distinct from the at least two pumps 7, 8, then serves to return the lubricating fluid 5 via a feed pipe 19 e.g. to the upper engine block 14.

In an embodiment, a pipe 16 serves to reinject the gas 15 into the crankcase(s) 2.

Figure 2:
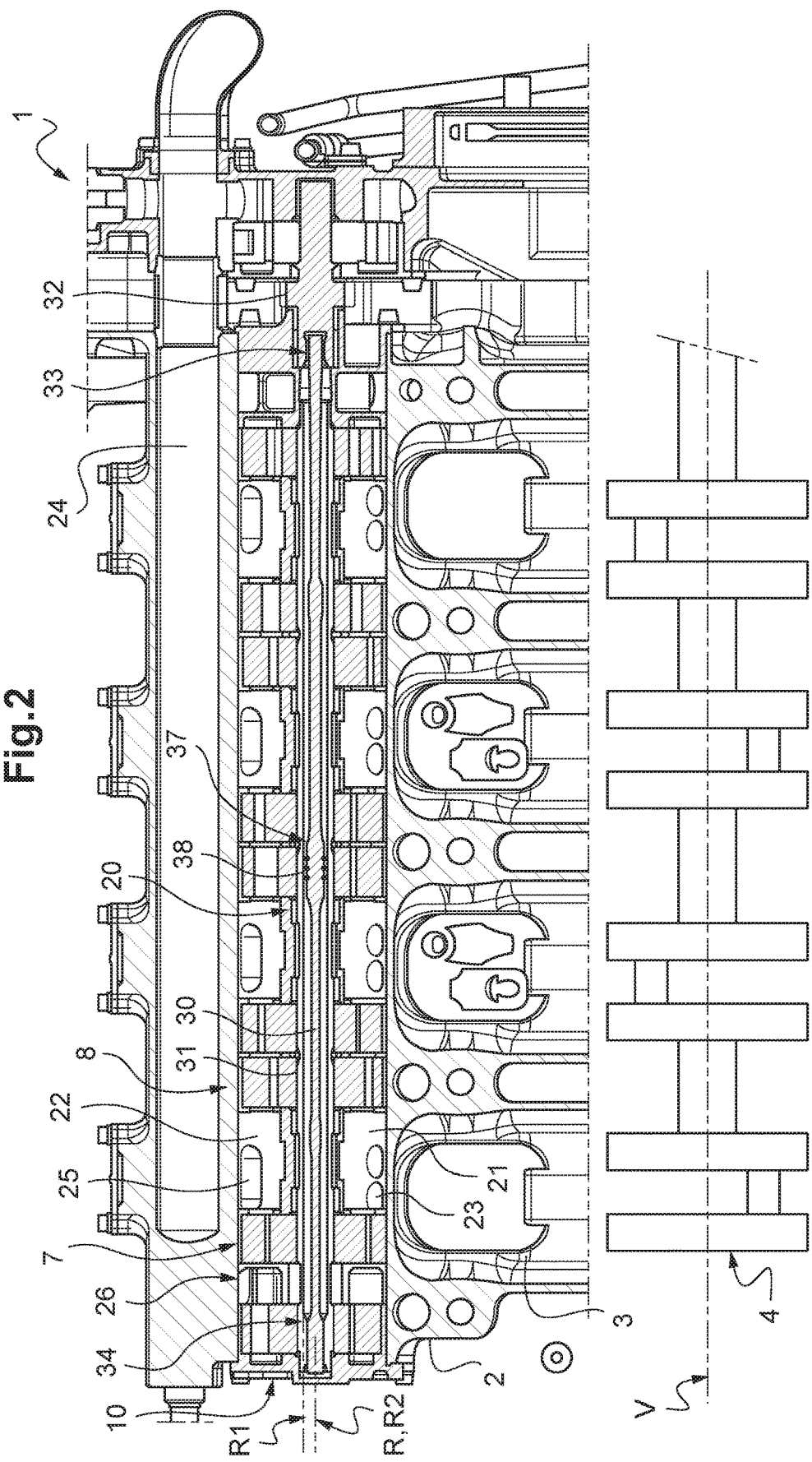
FIG. 2 is a fragmentary longitudinal section view of an internal combustion engine in accordance with the invention.

As shown in FIGS. 2 to 4, the at least two pumps 7, 8 forming the pump train 10 are housed directly in a cylindrical bore 26 in the crankcase(s) 2. Such a cylindrical bore 26 is generally made by machining the crankcase(s) 2. For example, such machining may consist in an operation of turning, milling, or drilling the crankcase(s) 2.

Furthermore, such pumps 7, 8 respectively comprise an inner lobe rotor 17, 18 and an outer lobe rotor 27, 28. Such inner lobe rotors 17, 18 are then rotatable about a first axis of rotation R1 and the outer lobe rotors 27, 28 are rotatable about a second axis of rotation R2 arranged in parallel with the first axis of rotation R1.

As shown in FIG. 2, the cylindrical bore 26 has an axis R that is advantageously arranged parallel to the axis V of the crankshaft 4. The internal combustion engine 1 then includes a common drive shaft 20 driven in rotation about the first axis of rotation R1. This common drive shaft 20 is then secured to the inner lobe rotors 17, 18 of the pump train 10, which in turn drive the outer lobe rotors 27, 28.

Furthermore, the common drive shaft 20 may be made up of a driving inner shaft 30 and a hollow outer shaft 31 that is driven in rotation by the inner shaft 30. Such an arrangement of the common drive shaft 20 as two distinct portions may serve in particular to adapt and absorb the twisting vibration of the drive train transmitting rotary motion, e.g. enabling a vehicle on which such an internal combustion engine 1 is fitted to be pulled, pushed, and/or provided with lift.

O-rings 38 can be arranged in a middle zone 37 of the inner shaft 30, firstly to provide radial centering of the inner shaft 30 relative to the outer shaft 31 and secondly to damp any vibration in a radial direction between the inner shaft 30 and the outer shaft 31. Such an arrangement thus makes it possible to avoid the mechanical friction and wear that would result therefrom.

Furthermore, such a common drive shaft 20 is driven in rotation via a toothed wheel (not shown) meshing with a drive gearwheel 32 secured to the inner shaft 30 at a proximal end 33 of the inner shaft 30.

The inner shaft 30 and the outer shaft 31 are secured to each other at a distal end 34 of the inner shaft 30. By way of example, this may be done by means of fluting of complementary shapes formed between the inner shaft 30 and the outer shaft 31. Such fluting then makes it possible to avoid eliminating a degree of freedom to move in translation at the distal end 34 of the inner shaft 30.

In addition, the at least two pumps 7, 8 have a common pump casing 9 with an outside face 12 of cylindrical shape complementary to the inside shape of the cylindrical bore 26. A central portion 13 of the common pump casing 9 then serves to define a common inlet chamber 21 and a common outlet chamber 22 for the mixture formed by the lubricating fluid and gas between each of the two pumps 7, 8.

As shown in FIG. 2, such a common pump casing 9 is positioned axially on the axis R of the cylindrical bore 26 so as to correspond firstly to at least one inlet hole 23 formed in a crankcase 2 leading to the common inlet chamber 21, and secondly at least one outlet hole 25 leading to the common outlet chamber 22.

Figure 5:
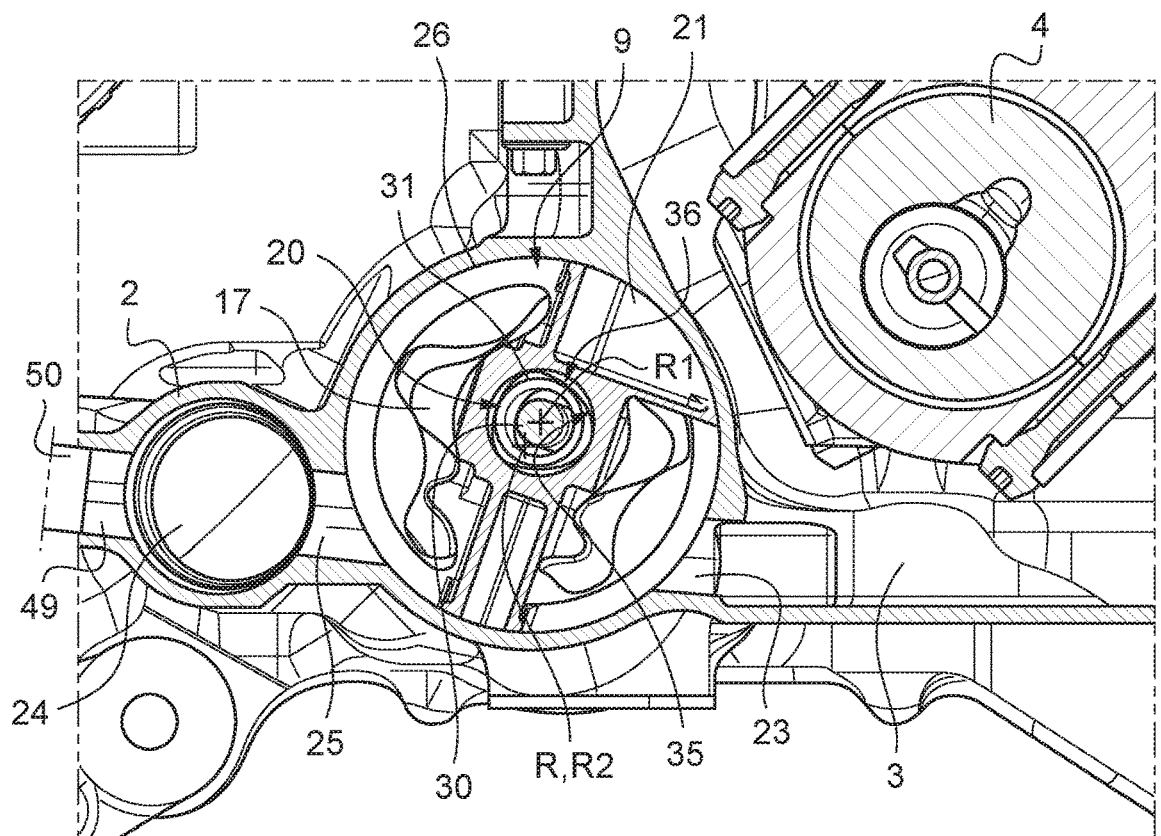
FIG. 5 is a fragmentary cross-section view of an internal combustion engine in accordance with the invention.

As shown in FIG. 5, such an inlet hole 23 serves to put the guide housing 3 into hydraulic communication with the common inlet chamber 21 of the common pump casing 9. The outlet hole 25 serves to put the common outlet chamber 22 of the common pump casing into hydraulic communication with a common outlet manifold 24. Such a common outlet manifold 24 is then arranged substantially in parallel with the axis R of the cylindrical bore 26.

According to an advantageous characteristic of the invention, the inlet hole 23 and the corresponding outlet hole 25 of a common pump casing 9 can be arranged substantially on the same axis and can be made in a single operation of drilling the crankcase(s) 2 from the outside of the crankcase(s) 2. A plug 50 then serves to close in leaktight manner an orifice 49 that is left open as a result of drilling the crankcase(s) 2.

Furthermore, and as shown in FIG. 3, the pump train 10 may have at least one rotary guide bearing 40 serving to guide rotation of the outer shaft 31 about the first axis of rotation R1 relative to the common pump casing 9.

Such a guide bearing 40 may then be formed by placing face to face two rings made of a material having a low coefficient of friction such as, in particular: self-lubricating bronze; polytetrafluoroethylene (PTFE); or any other material. A first ring is then secured to the outer shaft 31 and a second ring is secured to the common pump casing 9.

As shown in FIG. 4, the pump train 10 may comprise four sets of two pumps 7, 8 arranged on a common axis, namely the second axis of rotation R2. By way of example, each set may serve to pump the fluid mixture 5 of lubricating fluid and air contained in a chamber of the crankcase 2 suitable for receiving at least one connecting rod of the crankshaft 4. Each set of two pumps 7, 8 is then hydraulically isolated from an adjacent set of two pumps 7, 8 by means of a separator plate 44 fitted on either side of the common pump casing 9.

Such a separator plate between two sets of two pumps 7, 8 may also include lubricating channels for providing proper lubrication at the surfaces in contact with the inner lobe rotors 16, 18 and the outer lobe rotors 27, 28.

In addition, the end connection parts 41, 42 serve to position the pump train 10 axially inside the cylindrical bore 26 with accuracy. Such end connection parts 41, 42 also serve to prevent the common pump casing(s) 9 from rotating relative to the crankcase(s) 2. Such end connection parts 41, 42 may thus be secured with a fixed type connection to the crankcase(s) 2 by screw means 45.

In the particular situation in which a pump train has a plurality of juxtaposed sets of two pumps 7, 8, and thus a plurality of adjacent common pump casings 9, lugs of complementary shapes then serve to prevent each common pump casing 9 from rotating relative to another common pump casing 9 that is adjacent. Thus, the end connection parts 41, 42 serve to prevent rotation of an assembly made up of the various adjacent common pump casings 9 relative to the cylindrical bore 26 in which the assembly is arranged.

Finally, as shown in FIG. 5, each inner lobe rotor 17, 18 of the pump train 10 has an inner face 35 co-operating with an outer face 36 of the common drive shaft 20. These inner and outer faces 35 and 36 are thus arranged facing each other so as to enable the rotary motion of the outer shaft 31 around the first axis of rotation R1 to be transmitted to each of the inner lobe rotors 17, 18.

Furthermore, and by way of example, the inner and outer faces 35 and 36 may be of complementary shapes of polygonal section, or indeed they may present fluting suitable for co-operating with one another in complementary manner.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An internal combustion engine having at least one crankcase for defining a guide housing in which at least one crankshaft is guided in rotation about an axis of rotation and lubricated by a lubricating fluid, the at least one crankcase being of the "dry-sump" type, such an internal combustion engine comprising:
   a tank of lubricating fluid separate from the at least one crankcase;
   at least two pumps forming a pump train of pumps on a common axis and serving to pump a mixture formed by the lubricating fluid and gas at least from the at least one crankcase, the at least two pumps each respectively comprising an inner lobe rotor and an outer lobe rotor, the inner lobe rotor being rotatable about a first axis of rotation and the outer lobe rotor being rotatable about a second axis of rotation parallel to the first axis of rotation, each inner lobe rotor of the pump train being driven in rotation by a common drive shaft rotatable about the first axis of rotation, each outer lobe rotor of the pump train being driven in rotation by an inner lobe rotor of the pump train, and the pump train being fitted in a cylindrical bore of the at least one crankcase, the cylindrical bore having an axis coinciding with the second axis of rotation and distinct from the first axis of rotation; and
   at least one pipe enabling the at least one crankcase to be put into fluid flow communication with the at least two pumps and the tank of lubricating fluid;
   wherein the common drive shaft comprises a driving inner shaft and a hollow outer shaft driven by the inner shaft, the inner and outer shafts being arranged coaxially relative to each other.

2. The engine according to claim 1, wherein the axis of the cylindrical bore is arranged parallel to the axis of rotation of the at least one crankshaft.

3. The engine according to claim 1, wherein the at least two pumps have a common pump casing with an outer face of shape that is complementary to the shape of the cylindrical bore in the at least one crankcase, the common pump casing being prevented from rotating relative to the cylindrical bore, the common pump casing having a central portion serving to define a common inlet chamber and a common outlet chamber for the at least two pumps delivering the mixture formed by the lubricating fluid and gas.

4. The engine according to claim 3, wherein the at least one crankcase includes at least one inlet hole, each of the at least one inlet hole serving to put the guide housing of the at least one crankcase into hydraulic communication with the common inlet chamber of the common pump casing.

5. The engine according to claim 1, wherein the at least one crankcase includes a common outlet manifold for delivering the mixture formed by the lubricating fluid and gas, the common outlet manifold being arranged substantially parallel relative to the axis of the cylindrical bore.

6. The engine according to claim 3, wherein the at least one crankcase includes a common outlet manifold for delivering the mixture formed by the lubricating fluid and gas, the common outlet manifold being arranged substantially parallel relative to the axis of the cylindrical bore; and wherein the at least one crankcase includes at least one outlet hole, each of the at least one outlet holes serving to put the common outlet chamber of the common pump casing into hydraulic communication with the common outlet manifold.

7. The engine according to claim 1, wherein a drive member is secured with a fixed type connection to the inner shaft at a proximal end of the inner shaft, the inner and outer shafts being secured to each other with a fixed type connection at a distal end of the inner shaft.

8. The engine according to claim 1, wherein the common drive shaft has an ability to deform elastically in twisting.

9. The engine according to claim 1, wherein each inner lobe rotor of the pump train has an inner face co-operating with an outer face of the common drive shaft, the facing inner and outer faces being of complementary shapes of polygonal section.

10. The engine according to claim 1, wherein the pump train includes at least one guide bearing for guiding rotation about the first axis of rotation, the at least one guide bearing being arranged coaxially with the common drive shaft.

11. An internal combustion engine having a "dry-sump" crankcase defining at least a part of a guide housing in which a crankshaft is rotatable about an axis of rotation and lubricated by a lubricating fluid, the internal combustion engine comprising:
a tank of lubricating fluid separate from the crankcase;
a pump train comprising at least two pumps on a common axis and being capable of pumping a mixture formed by the lubricating fluid and gas, each of the at least two pumps comprising an inner lobe rotor and an outer lobe rotor, each inner lobe rotor being rotatable about a first axis of rotation and each outer lobe rotor being rotatable about a second axis of rotation parallel to the first axis of rotation, each inner lobe rotor capable of being driven in rotation by a common drive shaft rotatable about the first axis of rotation, each outer lobe rotor capable of being driven in rotation by one of the inner lobe rotors, and the pump train being disposed in a cylindrical bore of the crankcase, the cylindrical bore having an axis coinciding with the second axis of rotation and distinct and spaced from the first axis of rotation; and
a pipe enabling the crankcase to be put into fluid flow communication with the at least two pumps and the tank of lubricating fluid;
the common drive shaft comprising a driving inner shaft and a hollow outer shaft driven by the inner shaft, the inner and outer shafts being arranged coaxially relative to each other.

12. The engine according to claim 11, wherein the axis of the cylindrical bore is arranged parallel to the axis of rotation of the crankshaft.

13. The engine according to claim 11, wherein the at least two pumps have a common pump casing with an outer face shaped complementary to the shape of the cylindrical bore in the crankcase, the common pump casing being prevented from rotating relative to the cylindrical bore, the common pump casing having a central portion serving to define a common inlet chamber and a common outlet chamber for the at least two pumps delivering the mixture formed by the lubricating fluid and gas.

14. The engine according to claim 13, wherein the at least one crankcase includes at least one inlet hole, each of the at least one inlet hole serving to put the guide housing of the crankcase into hydraulic communication with the common inlet chamber of the common pump casing.

15. The engine according to claim 11, wherein the crankcase includes a common outlet manifold capable of delivering the mixture formed by the lubricating fluid and gas, the common outlet manifold being disposed substantially parallel relative to the axis of the cylindrical bore.

16. The engine according to claim 13, wherein the crankcase includes a common outlet manifold capable of delivering the mixture formed by the lubricating fluid and gas, the common outlet manifold being disposed substantially parallel relative to the axis of the cylindrical bore; and wherein the crankcase includes at least one outlet hole, each of the at least one outlet holes serving to put the common outlet chamber of the common pump casing into hydraulic communication with the common outlet manifold.

17. The engine according to claim 11, wherein a drive member is fixedly secured to the inner shaft at a proximal end of the inner shaft, the inner and outer shafts being fixedly secured to each at a distal end of the inner shaft.

18. The engine according to claim 11, wherein the common drive shaft is elastically deformable in twisting.

19. The engine according to claim 11, wherein each inner lobe rotor of the pump train has an inner face co-operating with an outer face of the common drive shaft, the facing inner and outer faces being of complementary shapes of polygonal section.

20. The engine according to claim 11, wherein the pump train includes a guide bearing for guiding rotation about the first axis of rotation, the at least one guide bearing being arranged coaxially with the common drive shaft.

* * * * *